United States Patent
Reddy et al.

(10) Patent No.: US 11,687,154 B2
(45) Date of Patent: Jun. 27, 2023

(54) SYSTEM AND METHOD FOR GENERATING A LIMITLESS PATH IN VIRTUAL REALITY ENVIRONMENT FOR CONTINUOUS LOCOMOTION

(71) Applicant: International Institute of Information Technology, Hyderabad, Hyderabad (IN)

(72) Inventors: Y Raghu Reddy, Hyderabad (IN); Raghav Mittal, Hyderabad (IN); Sai Anirudh Karre, Hyderabad (IN)

(73) Assignee: INTERNATIONAL INSTITUTE OF INFORMATION TECHNOLOGY, HYDERABAD, Hyderabad (IN)

( * ) Notice: Subject to any disclaimer, the term of this patent is extended or adjusted under 35 U.S.C. 154(b) by 0 days.

(21) Appl. No.: 17/827,664

(22) Filed: May 28, 2022

(65) Prior Publication Data
US 2022/0382367 A1 Dec. 1, 2022

(30) Foreign Application Priority Data
May 28, 2021 (IN) .............................. 202141023773

(51) Int. Cl.
*G06F 3/01* (2006.01)
*G06T 11/20* (2006.01)
*G06T 19/00* (2011.01)

(52) U.S. Cl.
CPC ............ *G06F 3/012* (2013.01); *G06T 11/203* (2013.01); *G06T 19/006* (2013.01); *G06F 2203/012* (2013.01); *G06T 2210/21* (2013.01); *G06T 2210/61* (2013.01)

(58) Field of Classification Search
CPC .. G06F 3/012; G06F 2203/012; G06T 11/203; G06T 19/006; G06T 2210/21; G06T 2210/61
See application file for complete search history.

(56) References Cited

U.S. PATENT DOCUMENTS

| | | | |
|---|---|---|---|
| 10,388,053 B1* | 8/2019 | Carter, Jr. | G06T 13/80 |
| 2009/0295809 A1* | 12/2009 | Girard | G06T 13/40 345/474 |
| 2011/0012903 A1* | 1/2011 | Girard | G06T 13/40 345/474 |
| 2014/0225900 A1* | 8/2014 | Girard | G06T 13/40 345/474 |
| 2021/0319624 A1* | 10/2021 | Kawabe | G06T 19/20 |

* cited by examiner

*Primary Examiner* — Jonathan A Boyd

(57) ABSTRACT

A method for generating a limitless path in a virtual reality environment (VR) for a continuous locomotion within a real physical space using Head-Mounted-Display (HMD) device associated with a user is provided. The method includes determining a line segment between two points that corresponds to an initial path travelled by the user. The method includes detecting a boundary of the VR environment to generate a next line segment. The method includes generating and adding a new line segment to end of the initial path. The method includes generating and adding the new line segment to the end of the next line segment. The method includes generating an updated path by adding the new line segment in a direction at the angle of shift angle to the direction of the next line segment. The method includes, configuring to output updated path as two-dimensional points to render updated path into VR environment.

20 Claims, 11 Drawing Sheets

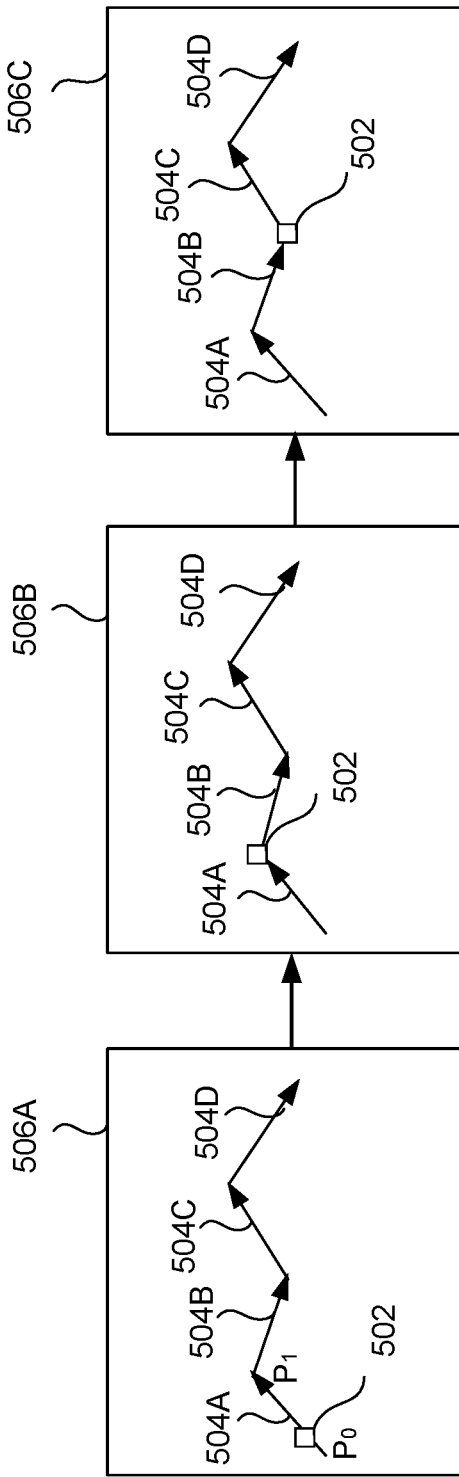

SYSTEM AND METHOD FOR GENERATING A LIMITLESS PATH IN VIRTUAL REALITY ENVIRONMENT FOR CONTINUOUS LOCOMOTION

CROSS-REFERENCE TO RELATED APPLICATIONS

This patent application claims priority to Indian provisional patent application no: 202141023773 filed on May 28, 2021, the complete disclosures of which, in their entirety, are hereby incorporated by reference.

TECHNICAL FIELD

The embodiments herein generally relate to a virtual reality (VR) system, and more particularly to a system and method for generating a limitless path in the VR environment for continuous locomotion.

DESCRIPTION OF THE RELATED ART

Continuous locomotion in a virtual reality (VR) environment is a bounded activity because of space constraints in a physical environment. It is a challenging task to set a user to navigate in a large virtual environment set up in a limited physical space. A virtual reality scene is usually oriented around the user and gives a bounded experience, thereby disallowing the user to experience limitlessness in terms of navigating across the virtual reality environment. Due to this, there may not be able to produce an unbounded experience for the user in the virtual reality environment.

In existing approaches, various techniques like walking on a treadmill, gesture-based walk-in-place methods, redirected walking, Non-Euclidian virtual environments and flexible space generation are used to produce the unbounded experience in various ways. These existing approaches have challenges like dependency on additional hardware, inability to adopt different room sizes, delays in scene phase shifting, etc., thereby compromising a scene quality. Further, the existing approaches make the VR setup immobile and expensive to use for VR applications, which require endless locomotion of the users.

For example, in the redirected walking-based approach, a system manipulates an orientation of the user's surroundings in the virtual environment in such a way that the system creates a perception of walking continuously in a straight line while the user is walking a curved path in the physical space. However, there is a visual distortion in scenes when reorientation of the environment is happening. One of the solutions to reduce the visual distortion is to use more computing resources. This redirected walking-based approach may also cause nausea to the user due to the unintuitive sensory inputs. In the Non-Euclidian virtual environments-based approach, Non-Euclidean spaces are either built in a hyperbolic space or are composed of portals. This approach allows to fit a vast virtual environment into a small physical space and allows the user to walk long distances within a finite space. However, there is a challenge to visualize and edit, as this approach follows complex mathematical functions and requires high-processing systems for rendering.

Moreover, the existing approaches use additional hardware, for example, a haptic device in addition to VR Head-Mounted-Device (HMD) to produce the unbounded experience. Further, the existing approaches advocate the HMD to be tied to one location for the continuous locomotion in the virtual environment. External hardware for the HMD is resource-heavy for unlimited location in virtual environments.

Accordingly, there remains a need to address the aforementioned technical drawbacks in existing technologies in creating the continuous locomotion with the unbounded experience in the virtual reality environment.

SUMMARY

In view of the foregoing, an embodiment herein provides a processor-implemented method for generating a limitless path in a virtual reality environment (VR) for a continuous locomotion within a real physical space using a Head-Mounted-Display (HMD) device associated with a user. The method includes determining a line segment ($L_i$) between an initial point ($P_0$) to a second point (P1) by analyzing input data that corresponds to an initial path travelled by the user in the real physical space from the initial point ($P_0$). The input data is obtained from the HMD associated with the user. In some embodiments, the line segment is determined by $Li=\overline{(Pi)*(Pi+1)}$, the line segment ($L_0$) is determined by an equation $Li=\overline{(Pi)*(Pi+1)}$ by including a value of i equal to 0, where 'i' is in a range of natural numbers comprising 0 to n−1 and '—' is an overhead bar that symbolises the line segment ($L_i$) of a predetermined length. The method includes detecting a boundary of the VR environment using a third point ($P_2$) to generate a second line segment ($L_2$) from an end of the first line segment ($L_0$) by projecting a plurality of rays from the second point ($P_1$) in different directions using a shift angle. In some embodiments, the shift angle is an angle between the first line segment of the initial path and the second line segment ($L_2$) of an upcoming path. The method includes generating a new line segment and adding the new line segment to the end of the initial path when the user moves forward on the initial path at a certain distance using the shift angle. The method includes generating a third line segment ($L_3$) using the equation $Li=\overline{(Pi)*(Pi+1)}$ by including the value of i equal to 3, and adding the third line segment ($L_3$) to the end of the second line segment ($L_2$) within the boundary when the user moves forward on the initial path at a certain distance and the third line segment ($L_3$) is added in a direction at an angle of the shift angle to the direction of the third line segment ($L_3$). The method includes generating an updated path by adding the third line segment ($L_3$) in the direction of the shift angle to the direction of the second line segment. The method includes, configuring to output the updated path as a list of two-dimensional points to render the updated path into the virtual reality environment using environmental properties. The method includes removing the first line segment ($L_0$) from the updated path when the user moves forward to cover a half of the initial path in the virtual reality environment, thereby continuously generating new line segments ($L_4$, $L_5$, $L_6$, ... $L_n$) and, updating the initial path by adding each new line segment at the end of the initial path and removing a previous line segment from beginning of the initial path to enable the continuous locomotion in the virtual reality environment through the HMD device associated with the user.

In some embodiments, the input data includes (i) the initial point ($P_0$) and head-yaw ($\beta_0$) of the HMD at the initial point (ii) dimensions of boundary of the real physical space D (x, z), and (iii) path properties that include segment length (l) and path width (w).

In some embodiments, the shift angle is determined by $\gamma_j = \beta_{i-1} - \pi/2 + ((\pi/j)*k)$, where k is in range $\{0, j\}$; $j>0$ and the shift angle ranges between $\beta_{i-1} - \pi/2$, $\beta_{i-1} + \pi/2$.

In some embodiments, the environmental properties include at least one of information regarding assets placed in the virtual reality environment, information about textures, or placement of assets in the virtual reality environment.

In some embodiments, points in the VR environment is determined by $Pi+1(x)=1*\sin \beta_i + Pi(x)$, and $Pi+1(z)=1*\cos \beta_i + Pi(z)$.

In some embodiments, the head-yaw ($\beta_i$) at $i^{th}$ point ranges from $\beta_{i-1} - \pi/2$, $\beta_{i-1} + \pi/2$.

In some embodiments, the method includes generating the path using the line and path walls without an intersection of the path walls by maintaining the ratio of the width of the path to the length of the path at a constant to avoid the intersection of the walls in the virtual reality environment.

In some embodiments, the method includes generating the limitless path in the virtual environment with parallel walls of the path by correlating the width of the path at the turns with the angle of the turn.

In some embodiments, the method includes generating dynamic path segments based on a random length unit value between the length of the fixed path segment and the proximity distance, thereby utilizing the real physical space efficiently.

In one aspect, there is provided one or more non-transitory computer-readable storage medium storing the one or more sequence of instructions, which when executed by the one or more processors, causes to perform a method for generating a limitless path in a virtual reality environment (VR) for a continuous locomotion within a real physical space using a Head-Mounted-Display (HMD) device associated with a user. The method includes determining a first line segment ($L_0$) between an initial point ($P_0$) to a second point ($P_1$) by analyzing input data that corresponds to an initial path travelled by the user in the real physical space from the initial point ($P_0$), wherein the line segment ($L_0$) is determined by an equation $Li=\overline{(Pi)*(Pi+1)}$ by including a value of i equal to 0, where 'i' is in a range of natural numbers comprising 0 to n−1 and '—' is an overhead bar that symbolises the line segment ($L_i$) of a predetermined length. The method includes detecting a boundary of the VR environment using a third point ($P_2$) to generate a second line segment ($L_2$) from an end of the first line segment ($L_0$) by projecting a plurality of rays from the second point ($P_1$) in different directions using a shift angle, wherein the shift angle is an angle between the first line segment of the initial path and the second line segment ($L_2$) of an upcoming path. The shift angle is an angle between the line segment of the initial path and the next line segment of an upcoming path. The method includes generating a new line segment and adding the new line segment to the end of the initial path when the user moves forward on the initial path at a certain distance using the shift angle. The method includes a third line segment ($L_3$) using the equation $Li=\overline{(Pi)*(Pi+1)}$ by including the value of i equal to 3, and adding the third line segment (L3) to the end of the second line segment ($L_2$) within the boundary when the user moves forward on the initial path at a certain distance and the third line segment ($L_3$) is added in a direction at an angle of the shift angle to the direction of the third line segment ($L_3$). The method includes generating an updated path by adding the third line segment ($L_3$) in the direction of the shift angle to the direction of the second line segment. The method includes, configuring to output the updated path as a list of two-dimensional points to render the updated path into the virtual reality environment using environmental properties. The method includes removing the first line segment ($L_0$) from the updated path when the user moves forward to cover a half of the initial path in the virtual reality environment, thereby continuously generating new line segments ($L_4$, $L_5$, $L_6$, . . . $L_n$) and, updating the initial path by adding each new line segment at the end of the initial path and removing a previous line segment from beginning of the initial path to enable the continuous locomotion in the virtual reality environment through the HMD device associated with the user.

In another aspect, there is provided a system for generating a limitless path in a virtual reality environment (VR) for a continuous locomotion within a real physical space using a Head-Mounted-Display (HMD) device associated with a user. The system includes a memory that stores a database and a set of modules, a processor in communication with the memory. The processor retrieves executing machine-readable program instructions from the memory which, when executed by the processor, enable the processor to (i) determine a first line segment ($L_0$) between an initial point ($P_0$) to a second point ($P_1$) by analyzing input data that corresponds to an initial path travelled by the user in the real physical space from the initial point ($P_0$), wherein the input data is obtained from the HMD device associated with the user; (ii) detect a boundary of the VR environment using a third point ($P_2$) to generate a second line segment ($L_2$) from an end of the first line segment ($L_0$) by projecting a plurality of rays from the second point ($P_1$) in different directions using a shift angle, wherein the shift angle is an angle between the first line segment of the initial path and the second line segment ($L_2$) of an upcoming path; (iii) generate a third line segment ($L_3$) using the equation $Li=\overline{(Pi)*(Pi+1)}$ by including the value of i equal to 3, and adding the third line segment ($L_3$) to the end of the second line segment ($L_2$) within the boundary when the user moves forward on the initial path at a certain distance and the third line segment ($L_3$) is added in a direction at an angle of the shift angle to the direction of the third line segment ($L_3$); (iv) generate an updated path by adding the third line segment ($L_3$) in the direction at the angle of the shift angle to the direction of the second line segment; (v) configure to output the updated path as a list of two-dimensional points to render the updated path into the virtual reality environment using environmental properties; and (vi) remove the first line segment ($L_0$) from the updated path when the user moves forward to cover a half of the initial path in the virtual reality environment, thereby continuously generating new line segments ($L_4$, $L_5$, $L_6$, . . . $L_n$) and, updating the initial path by adding each new line segment at the end of the initial path and removing a previous line segment from beginning of the initial path to enable the continuous locomotion in the virtual reality environment through the HMD device associated with the user.

In some embodiments, the input data includes (i) the initial point ($P_0$) and head-yaw ($\beta_0$) of the HMD at the initial point (ii) dimensions of boundary of the real physical space D (x, z), and (iii) path properties that include segment length (l) and path width (w).

In some embodiments, the shift angle is determined by $\gamma_j = \beta_{i-1} - \pi/2 + ((\pi/j)*k)$, where k is in range $\{0, j\}$; $j>0$ and the shift angle ranges between $\beta_{i-1} - \pi/2$, $\beta_{i-1} + \pi/2$.

In some embodiments, the environmental properties comprise at least one of information regarding assets placed in the virtual reality environment, information about textures, or placement of assets in the virtual reality environment.

In some embodiments, points in the VR environment are determined by $Pi+1(x)=l*\sin \beta_i+Pi(x)$, and $Pi+1(z)=l*\cos \beta_i+Pi(z)$.

In some embodiments, the head-yaw ($\beta_i$) at $i^{th}$ point ranges from $\beta_{i-1}-\pi/2$, $\beta_{i-1}+\pi/2$.

In some embodiments, the processor is configured to generate the path using the line and path walls without an intersection of the path walls by maintaining the ratio of the width of the path to the length of the path at a constant to avoid the intersection of the walls in the virtual reality environment.

In some embodiments, the processor is configured to generate the limitless path in the virtual environment with parallel walls of the path by correlating the width of the path at the turns with the angle of the turn.

In some embodiments, the processor is configured to generate dynamic path segments based on a random length unit value between the length of the fixed path segment and the proximity distance, thereby utilizing the real physical space efficiently.

The system and/or method is used to generate a limitless path in a virtual reality environment (VR) for a continuous locomotion. Additionally, generate dynamic path segments based on a random length unit value between the length of the fixed path segment and the proximity distance. The system or method may expedite the process of produce an unlimited experience for the user in terms of navigating across the virtual reality environment, thereby utilizing the real physical space efficiently. The system facilitates the user to walk continuously in the virtual reality environment within a bounded real physical space. The system creates a path that does not collide with the boundaries of the real physical space, thereby creating a limitless locomotion experience for the user when rendered. That is, the system ensures the path that remains within the real physical space and does not intersect or overlap, as the system detects the path's proximity with the virtual environment's boundaries. These facilities the continuous locomotion experience and avoids cross path generation. The system further allows the user to walk naturally, hence providing haptic feedback naturally. The system is adaptable to varied physical space (i.e., play area) sizes with room-scale tracking and consumes fewer resources compared to existing limitless locomotion systems. The system can work only with the Head-mounted display device without any additional hardware support. The system is independent of hardware and is applicable for all Head-Mounted devices with 6 Degrees of Freedom (DOF) support. The system is independent of all virtual reality game engines and can be implemented with any virtual reality game engine. The system is mathematical in realization. Thus, the system holds true for all fundamental laws of physics.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 5A-5F are exemplary diagrams that illustrate a behaviour of the virtual environment continuous path generating server of FIG. 1 according to some embodiments herein;

DETAILED DESCRIPTION OF THE DRAWINGS

Figure 1:
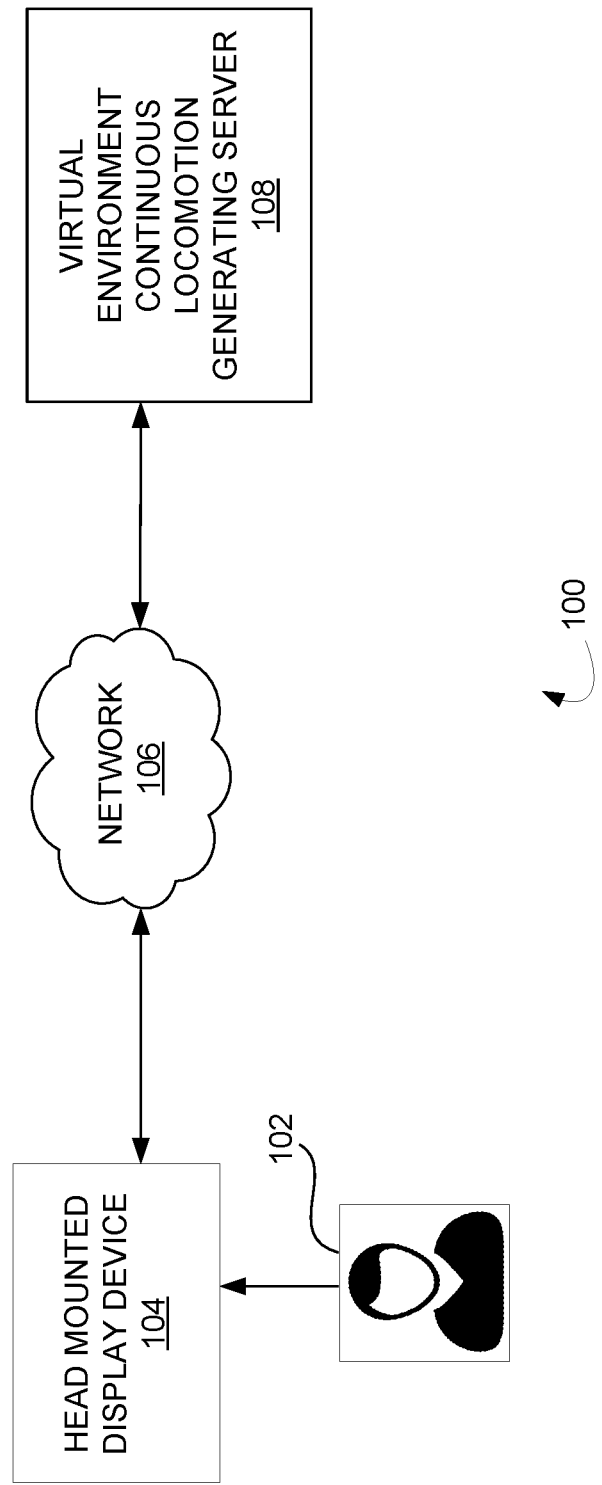
FIG. 1 is a block diagram of a system for generating a limitless path in a virtual reality environment (VR) for a continuous locomotion within a real physical space using a Head-Mounted-Display (HMD) device associated with a user according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system for creating a continuous locomotion in a limitless path with an unbounded experience in a virtual reality environment without a need of additional hardware support. Various embodiments disclosed herein provide a system and method for generating a continuous path in the virtual reality environment using only Head-Mounted-Device (HMD) with 6-Degrees-Of-Freedom for the continuous locomotion with the unbounded experience. Referring now to the drawings, and more particularly to FIGS. 1 through 10, where similar reference characters denote corresponding features consistently throughout the figures, preferred embodiments are shown.

FIG. 1 is a block diagram of a system 100 for generating a continuous path in a virtual reality environment (VR) for a continuous locomotion using a Head-Mounted-Display (HMD) device 104 associated with a user 102 according to some embodiments herein. The system 100 includes the HMD 104 associated with the user 102, and a virtual environment continuous locomotion generating server 108. The virtual environment continuous path generating server 108 includes a memory that stores a database and a set of modules and a device processor that executes the set of modules.

The user 102 may employ the HMD 104 to experience the virtual reality environment that is rendered visually by the HMD 104. The user 102 can explore, navigate, and move within the virtual reality environment rendered by the HMD 104 by moving within a real physical space.

The HMD 104 is associated with the user 102 and is communicatively connected with the virtual environment continuous locomotion generating server 108 through a network 106. In some embodiments, the network 104 includes, but not limited to, a wireless network, a wired network, a combination of the wired network and the wireless network or Internet and the like.

The HMD 104 associated with the user 102 is configured to obtain input data from the real physical space, when the user 102 is present in the real physical space. In some embodiments, the input data includes HMD position information, head position information, and dimensions data of the real physical space. The HMD 104 may include at least one sensor to obtain the input data. The HMD position information may include coordinates of the user's position and orientation in the real physical space. The head position information may include HMD head-yaw in the virtual reality environment. The dimensions data of the real physical space may include boundary information of the real physical space. In some embodiments, the HMD 104 has 6-Degrees-Of-Freedom (6-DoF) tracking capability to track the orientation and position of the user 102 in the real physical space. In some embodiments, the input data includes (i) the initial point ($P_0$) and head-yaw ($\beta_0$) of the HMD 104 at the initial point (ii) dimensions of boundary of the real physical space D (x, z), and (iii) path properties that include segment length (l) and path width (w).

The virtual environment continuous locomotion generating server 108 receives the input data from the HMD 104 and outputs a path based on the input data and path properties. In some embodiments, the path is a list of 2D points or line segments representing a line. The virtual environment continuous locomotion generating server 108 generates the generated path and renders the generated path into the virtual reality environment using environmental properties. The environmental properties may include information regarding assets placed in the virtual reality environment, information about textures, placement of assets in the VR environment, etc. The path properties and the environmental properties are metadata that may be provided by a designer for generating the VR environment with the desired configuration to achieve a use case and may be stored in the database.

The virtual environment continuous locomotion generating server 108 determines a line segment ($L_i$) between an initial point ($P_0$) to a terminal point (P1) by analyzing the input data that corresponds to an initial path travelled by the user in the real physical space from the initial point ($P_0$). The initial path may include a set number of 2D points (or line segments). The initial path may be rendered into the virtual reality environment by the virtual environment continuous locomotion generating server 108. For example, the first line segment may be represented as: $L_0 = \overline{P_0 P_1}$. For a second line segment $L_1$, $P_1$ and $P_2$ are the starting and terminal points respectively.

The virtual environment continuous locomotion generating server 108 detects a boundary of the VR environment using a new point to generate a next line segment from an end of the line segment by projecting one or more rays in different directions using a shift angle. The virtual environment continuous locomotion generating server 108 generates a new line segment and adds the new line segment to the end of the initial path when the user 102 moves forward on the initial path at a certain distance using the shift angle. To detect the boundary for generating a path, the virtual environment continuous locomotion generating server 108 uses 'j' value that equally divides a 180° range into multiple possible rays. If a new point $P_{i+1}$ is generated for generating the new line segment by the virtual environment continuous locomotion generating server 108, then the virtual environment continuous locomotion generating server 108 projects j+1 number of rays in multiple directions with certain angle γ as follows:

$$\gamma_j = \beta_{i-1} - \pi/2 + ((\pi/j)*k),$$

where k is in range $\{0, j\}$; j>0 and a range of angle is $\beta_{i-1} - \pi/2$, $\beta_{i-1} + \pi/2$.

For example, if the value of j=4, the virtual environment continuous locomotion generating server 108 projects j+1 rays i.e. 5 rays at equal angles between $\beta_{i-1} - \pi/2$, $\beta_{i-1} + \pi/2$ such as $\gamma_0, \gamma_1, \gamma_2, \gamma_3, \gamma_4$. The source of the rays is $P_i$ and length is equal to path length+path width/2.

The virtual environment continuous locomotion generating server 108 generates a new line segment using $L_i = \overline{(P_i)*(P_{i+1})}$ where 'i' is in a range of natural numbers comprising 0 to n−1 and '—' is an overhead bar that symbolises the line segment ($L_i$) of a predetermined length and adding the new line segment to the end of the next line segment within the detected boundary when the user moves forward on the initial path at a certain distance and the new line segment is added in a direction at an angle of the shift angle to the direction of the next line segment. The virtual environment continuous locomotion generating server 108 generates an updated path by adding the new line segment in a direction at the angle of the shift angle to the direction of the next line segment.

The virtual environment continuous locomotion generating server 108 configures to output the updated path as a list of two-dimensional points to render the updated path into the virtual reality environment using environmental properties. The virtual environment continuous locomotion generating server 108 removes the line segment from the updated path when the user moves forward to cover half of the path in the virtual reality environment, thereby continuously generating new line segments, updating the initial path by adding each new line segment at the end of the initial path and removing line segment from beginning of the initial path to enable the continuous locomotion in the virtual reality environment through the HMD 104 associated to the user 102.

The virtual environment continuous locomotion generating server 108 may be configured to generate (i) a path with multiple path options and (ii) a path in a reverse direction. The user 102 may choose at least one path that goes in different directions each turn. The user 102 may choose the path in the reverse direction, if the user 102 moves in a backward direction. The system 100 may be implemented with at least one bicycle, treadmill, controller, or any other external hardware.

The system 100 may be integrated with at least one of (i) an obstacle avoidance system, (ii) redirection techniques, and (iii) translation gains. The obstacle avoidance system may allow the virtual environment continuous locomotion generating server 108 to generate the path in the real physical space with obstacles. The redirection techniques and translation gains may allow the virtual environment continuous locomotion generating server 108 to generate the path larger than the real physical space.

Figure 2:
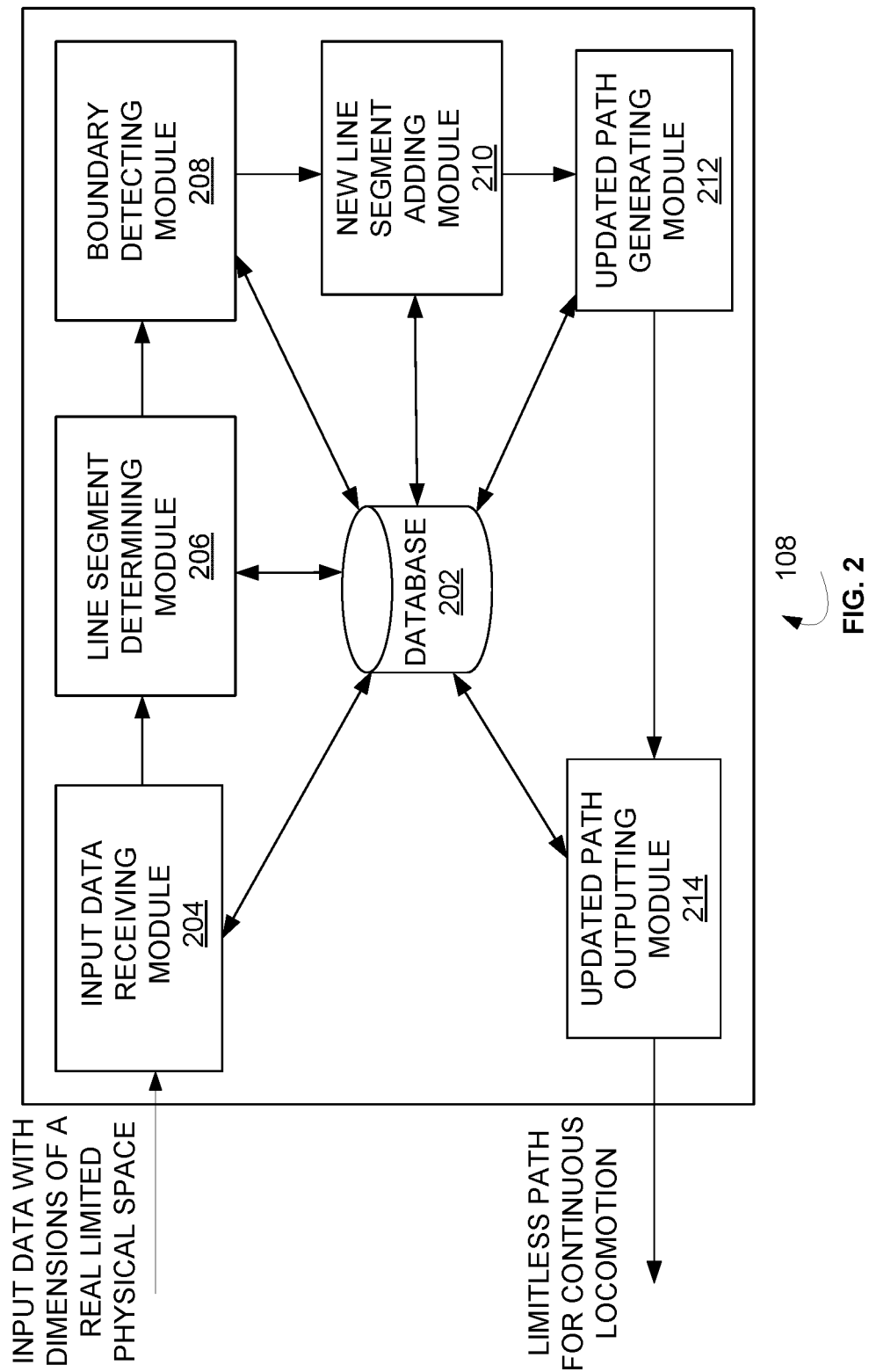
FIG. 2 is a block diagram of a virtual environment continuous locomotion generating server of FIG. 1 according to some embodiments herein.

FIG. 2 is a block diagram of the virtual environment continuous locomotion generating server 108 of FIG. 1 according to some embodiments herein. The virtual environment continuous locomotion generating server 108 includes a database 202, an input data receiving module 204, a line segment determining module 206, a boundary detecting module 208, a new line segment adding module 210, an updated path generating module 212, and an updated path outputting module 214.

The input data receiving module 204 is communicatively connected with the HMD 104 associated with the user 102 and is configured to receive input data. The input data may include HMD position information, head position information, and dimensions data of the real physical space from the HMD 104. The HMD position information may include coordinates of the user's position and orientation in a real physical space. The head position information may include HMD head-yaw in the virtual reality environment. The dimensions data of the real physical space may include boundary information of the real physical space.

The line segment determining module 206 determines a line segment ($L_i$) between an initial point ($P_0$) to a terminal point (P1) by analyzing the input data that corresponds to an initial path travelled by the user in the real physical space from the initial point ($P_0$). In some embodiments, the initial path is a line that consists of successive line segments connected at different angles (i.e., a set number of 2D points). In some embodiments, the input data includes (i) the initial point ($P_0$) and head-yaw ($\beta_0$) of the HMD at the initial point (ii) dimensions of boundary of the real physical space D (x, z), and (iii) path properties that include segment length (l) and path width (w). In some embodiments, points in the VR environment are determined by $Pi+1(x)=1*\sin \beta_i+Pi(x)$, and $Pi+1(z)=1*\cos \beta_i+Pi(z)$. In some embodiments, the head-yaw ($\beta_i$) at $i^{th}$ point ranges from $\beta_{i-1}-\pi/2$, $\beta_{i-1}+\pi/2$.

The boundary detecting module 206 detects a boundary of the VR environment using a new point to generate a next line segment from an end of the line segment by projecting a plurality of rays in different directions using a shift angle. In some embodiments, the shift angle is an angle between the line segment of the initial path and the next line segment of an upcoming path. In some embodiments, the shift angle is determined by $\gamma_j=\beta_{i-1}-\pi/2+((\pi/j)*k)$, where k is in range $\{0, j\}$; j>0 and the shift angle ranges between $\beta_{i-1}-\pi/2$, $\beta_{i-1}+\pi/2$.

The new line segment adding module 210 generate a new line segment using $Li=\overline{(Pi)*(Pi+1)}$ and adding the new line segment to the end of the next line segment within the detected boundary when the user moves forward on the initial path at a certain distance and the new line segment is added in a direction at an angle of the shift angle to the direction of the next line segment.

The updated path generating module 212 generate an updated path by adding the new line segment in a direction at the angle of the shift angle to the direction of the next line segment. The updated path outputting module 212 configure to output the updated path as a list of two-dimensional points to render the updated path into the virtual reality environment using environmental properties. In some embodiments, the environmental properties comprise at least one of information regarding assets placed in the virtual reality environment, information about textures, or placement of assets in the virtual reality environment. The environmental properties may be stored in the database 202.

The line segment generating module 206 the line segment from the updated path when the user moves forward to cover half of the path in the virtual reality environment, thereby continuously generating new line segments, updating the initial path by adding each new line segment at the end of the initial path and removing line segment from beginning of the initial path to enable the continuous locomotion in the virtual reality environment through the HMD 104 associated to the user 102 until the system 100 is terminated externally by the user 102.

Figure 3A:
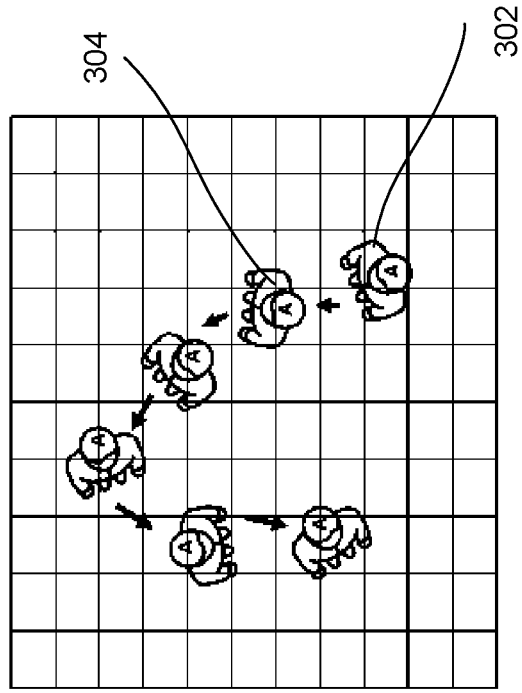
FIG. 3A is an exemplary diagram that represents a line segment determining process for continuous locomotion according to some embodiments herein.

FIG. 3A is an exemplary diagram that represents a line segment determining process according to some embodiments herein. The line segment determining process uses (i) users' initial position ($P_0$) and head-yaw ($\beta_0$) at the initial position; (ii) dimensions of boundary D (x, z) of a real physical space, and (iii) path properties that include segment length (l) and path width (w) as input to generate an initial path. A perpendicular distance between parallel boundaries may represent the width of the path in a virtual reality environment.

As shown in FIG. 3A, the initial path includes a first line segment $L_0$ that has a starting point $P_0$ and terminal point $P_1$. The first line segment may be represented as:

$L_0=\overline{P0P1}$. For a second line segment $L_1$, $P_1$ and $P_2$ are the starting and terminal points respectively. From the first- and second-line segments, the line segment $L_i$ is represented as:

$Li=\overline{(Pi)*(Pi+1)}$ In some embodiments, the length of the initial path is a predefined constant value.

In the real physical space, coordinates of the user's position ($P_{i+1}$) are calculated using the following equations:

$$P_{i+1}(x)=l*\sin \beta_i+P_i(x)$$

$$P_{i+1}(z)=l*\cos \beta_i+P_i(z),$$

where 0<=i<total number of segments generated at the start; x and z are the limits of the boundary in a plane along x-axis and z-axis and $\beta_i$ is head-yaw of the user (i.e. HMD's orientation along the y-axis in virtual reality environment). Using the coordinates of the user's position ($P_{i+1}$), the line segment generating module 206 generates the initial path in a defined boundary of D (x, z).

The virtual environment continuous path generating server 108 generates an upcoming $P_i$ to generate a new line segment ($L_i$) by detecting the proximity of $P_{i-1}$ to the boundary. When $P_{i-1}$ is not close to the boundary, the line generating module 206 uses $\beta_i$ value that is set to a random value in range $\{\beta_{i-1}-\pi/2, \beta_{i-1}+\pi/2\}$ for generating the new line segment $L_i$ for a given position $P_i$ at the boundary.

Figure 3B:
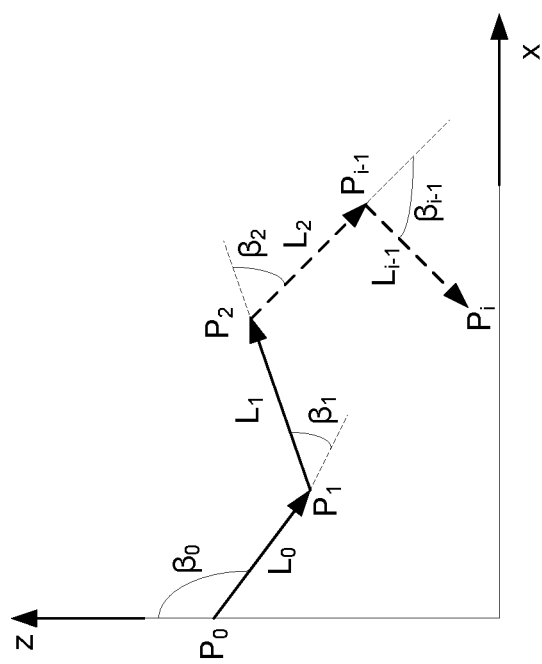
FIG. 3B is an exemplary diagram that represents a continuous locomotion of a user in a virtual environment according to some embodiments herein.

FIG. 3B is an exemplary diagram that represents a continuous locomotion of a user in a virtual environment according to some embodiments herein. As shown in the exemplary diagram, the initial path of the user 102 includes a first line segment $L_0$ that has a starting point $P_0$ and terminal point $P_1$ at 302. At 304, the user 102 is travelled along a second line segment $L_1$ that is determined using $P_1$ and $P_2$. Thereby, the continuous locomotion of the user 102 within the real physical space is shown in the diagram.

Figure 4:
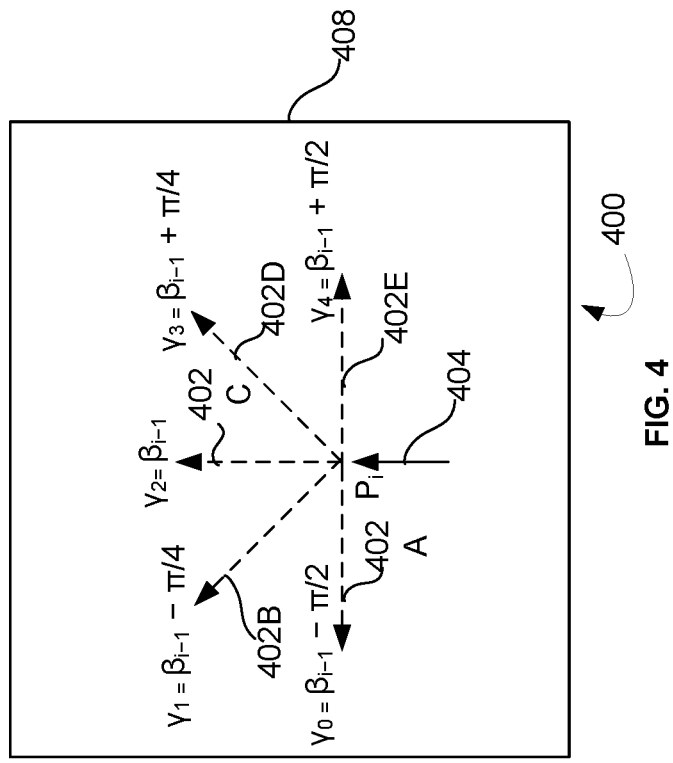
FIG. 4 is an exemplary diagram that represents a boundary detection process of a boundary detecting module of FIG. 2 according to some embodiments herein.

FIG. 4 is an exemplary diagram that represents a boundary detection process of a boundary detecting module 208 of FIG. 2 according to some embodiments herein. In the exemplary diagram 400, dashed lines 402A-E denote rays, a solid line 404 denotes a direction of a last line segment of the current path and a box 408 denotes a boundary of a real physical space.

To detect the boundary 408 for generating a path, the boundary detecting module 208 uses 'j' value that equally divides a 1800 range into multiple possible rays 402A-E as shown in FIG. 4. If a new point $P_{i+1}$ is generated for generating a new line segment by the line segment determining module 206, the boundary detecting module 208 projects j+1 number of rays in multiple directions with certain angle γ as follows:

$$\gamma_j = \beta_{i-1} - \pi/2 + ((\pi/j)*k),$$

where k is in range {0, j}; j>0 and a range of angle is $\beta_{i-1} - \pi/2$, $\beta i - 1 + \pi/2$.

For example, if the value of j=4, the boundary detecting module 208 projects j+1 rays i.e. 5 rays 402A-E at equal angles between $\beta_{i-1} - \pi/2$, $\beta_{i-1} + \pi/2$ such as $\gamma_0, \gamma_1, \gamma_2, \gamma_3, \gamma_4$ as shown in FIG. 4. The source of the rays 402A-E is $P_i$ and length is equal to path length+path width/2.

The boundary detecting module 208 uses one of $\gamma_i$ direction out of 5 rays to generate the path with the new line segment $L_i$, if none of the rays 402A-E hit the boundary 408 as shown in FIG. 4. In some embodiments, the boundary detecting module 208 uses at least one non-hitting ray direction to generate the path if the other rays hit the boundary 408 (not shown). In some embodiments, the boundary detecting module 208 generates two more additional non-hitting rays in directions of $\gamma_{0*} = \beta_{i-1} - 3\pi/4$, and $\gamma_{1*} = \beta_{i-1} + 3\pi/4$ (not shown) and uses the at least one direction of the two more additional non-hitting rays for generating the path, if all the rays 402A-E hit the boundary 408.

FIGS. 5A-5F are exemplary diagrams that illustrate a behaviour of the virtual environment continuous path generating server 108 of FIG. 1 according to some embodiments herein. The exemplary diagrams show the behaviour of the virtual environment continuous path generating server 106 for a use case where the user 102 wants to walk continuously in the VR environment within a boundary of a real physical space. In the exemplary diagrams, a rectangular shape 502 denotes a position of the user 102, line segments 504A-G denote a course and direction of paths generated by the virtual environment continuous path generating server 108, and boxed walls 506A-F denote boundaries of the real physical space.

As shown in FIG. 5A, the virtual environment continuous path generating server 106 generates an initial path 504A-D from a user's initial position to some length. The initial path 504A-D is rendered by the virtual environment continuous path generating server 106 in the VR environment. As shown in FIG. 5B, the user 102 moves towards the path 504A-D. The virtual environment continuous path generating server 106 generates a new line segment 504E when the user 102 reaches half of the initial path (i.e. current path) 504A-D as shown in FIG. 5C. The limitless path generating module 106A updates the current path 504A-D by adding the new line segment 504E at an end of the current path 504A-D and removes the line segment 504A from the beginning of the current path 504A-D to generate an updated path 504B-E as shown in FIG. 5D.

The updating of the current path continues as shown in FIGS. 5E-5F by the virtual environment continuous path generating server 106 until a termination by the user 102 to create a continuity perception. From the FIGS. 5A-5F, it is observed that the paths generated by the virtual environment continuous path generating server 106 remain within the boundaries of the real physical space 306 without any intersection or overlapping.

Figure 6B:
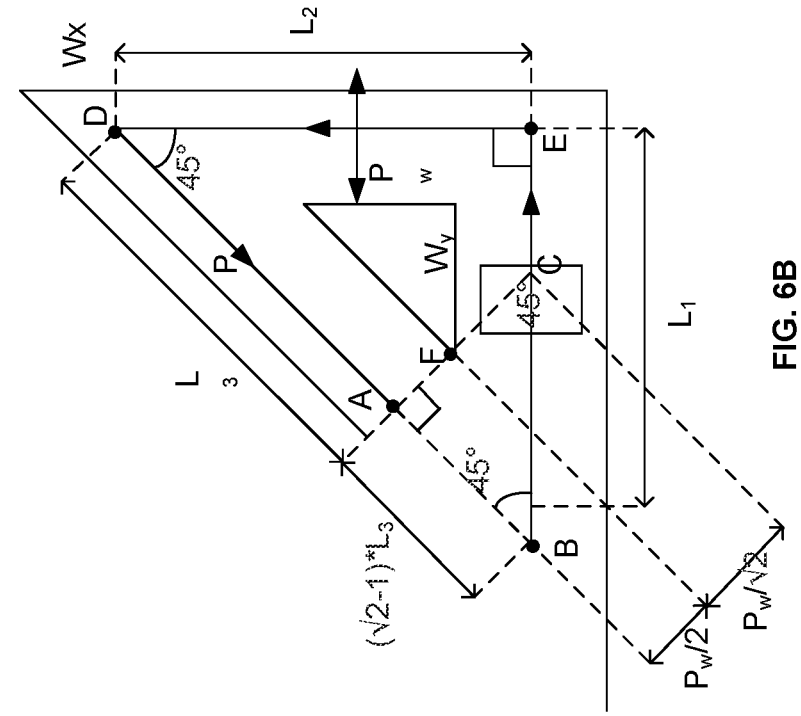
FIGS. 6A-6B are exemplary diagrams that represent generation of the continuous path without an intersection of the path walls in the VR environment according to some embodiments herein.
Figure 6A:
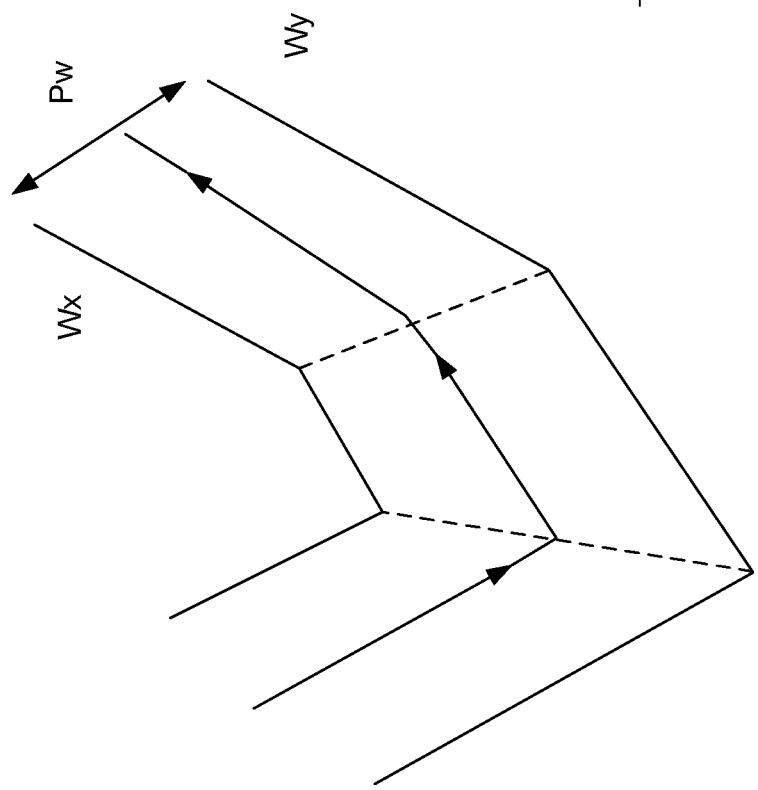

FIGS. 6A-6B are exemplary diagrams that represent generation of the continuous path without an intersection of path walls in the VR environment according to some embodiments herein. FIG. 6A is an exemplary diagram that represents a continuous path p as shown in the figure that is generated in the form of a line and walls that are equidistant from the center of the line. The walls are shown as $w_x$, and $w_y$ that are separated by a path width Pw. The path that is generated during the navigation in the virtual environment tends to collide with itself when the path has a 90-degrees turn followed by a subsequent 45-degrees turn or vice-versa. The collision of the generated path leads to intersection of the path p and obstructs the user 102 from walking. Thereby, the overall path gets distorted.

Figure 7A:
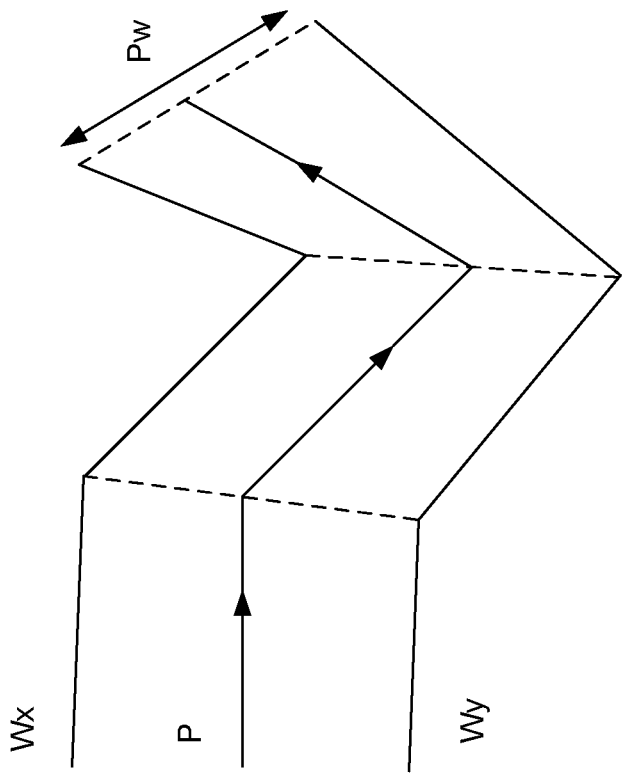
FIGS. 7A-7B are exemplary diagrams that represent a calculation of the width of path at turns in the continuous path according to some embodiments herein.
Figure 7B:
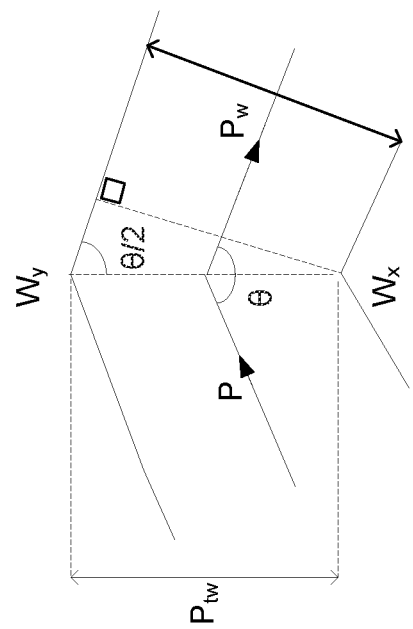
Figures 8A, 8B, 8C, 8D, 8E, 8F, 8G, 8H:
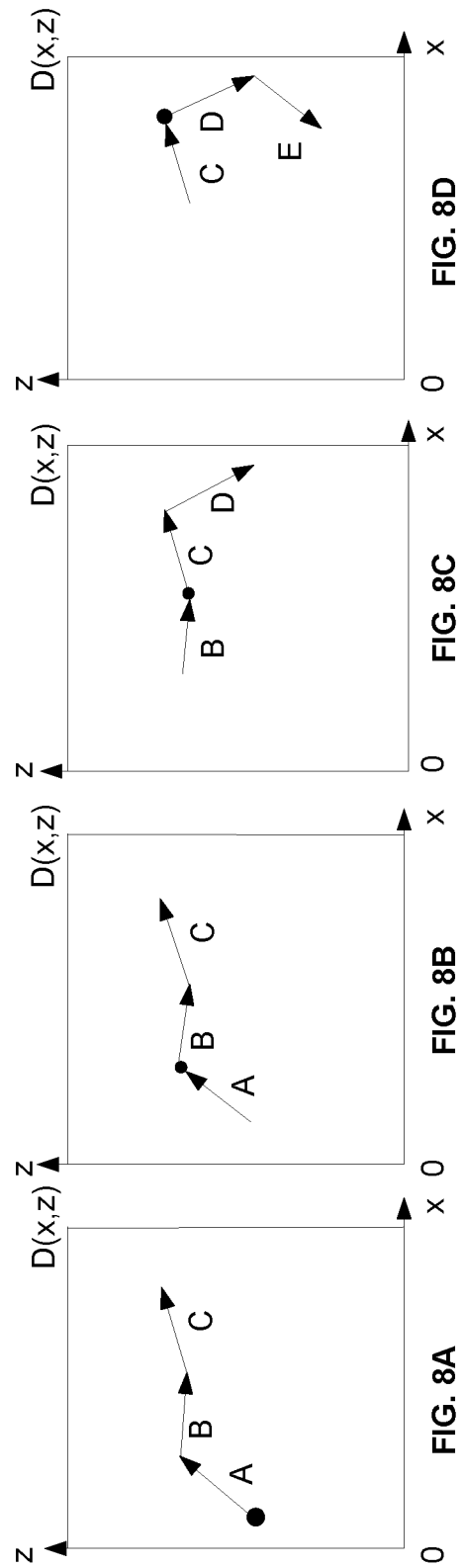
FIGS. 8A-8H are exemplary diagrams that represent generating dynamic path segments to utilize the real physical space efficiently according to some embodiments herein.

FIG. 6B is an exemplary diagram that represents a calculation of a ratio to avoid intersection of walls. In an ideal case, $w_y$ wall should be formed as a triangle as shown in the figure. To avoid the obstruction, the path width Pw and path length L are to be set in a certain ratio. The ratio is normalized using a constant called ρ. The value of ρ ensures that the walls does not collide in such an abrupt turn of 90 degrees followed by 45 degrees or vice versa. As shown in the figure, L1, L2 and L3 are the lengths of the path segment (p) rendered here are equal i.e. L1=L2=L3. To avoid the collision of $w_y$ wall, the distance of AB with AC of the path p. As BD, DE and EB form a right-angle triangle, AB, BC and CA also forms a right-angle triangle. Considering ΔBDE, as BE=L1, ED=L2 and AD=L3, then AB=(√2−1)*L3. Then ρ can be derived as follows, (√2−1)*L=Pw/2+Pw/√2. Here Pw/2 is length of AF and Pw/√2 is length of FC. Thus the ρ can be further defined as: (2*(√2−1)/(1+√2))*L=Pw ∴ ρ=(2*(√2−1))/(1+√2)=0.343. Using L=ρ*Pw, the collision of $w_y$ wall can be avoided in a case of abrupt turn. For a reasonable walkable path, the path width FIGS. 7A-7B are exemplary diagrams that represent a calculation of the width of path at turns in the continuous path according to some embodiments herein. FIG. 7A is an exemplary diagram that represents generation of narrow paths causing deformity. The exemplary diagram includes a generated corridor with path width Pw which is a fixed constant value, and the corridor is not expected to be placed in parallel, that is walls $w_x$ and $w_y$ are not parallel to each other in the virtual environment. Pw is a fixed constant value and is not estimated to change during the turns, that is when the path is set to take an angular turn during the navigation, the Pw is not intended to change. Thereby, the walls wx and wy gets distorted, causing irregular path width Pw. At turns, the walls wx and wy are no longer equidistant to each other when compared with straight paths. Thereby, the narrow paths are generated causing deformity as shown in the figure.

FIG. 7B is an exemplary diagram that represents calculation of the path width of the walls at the turns. To avoid the deformity of the path due to narrow paths, the path width Pw at the turns had to be correlated with an angle of the turn rather than being a fixed constant. Pw is the path width which is constant when path segment (p) is a straight line. $P_{tw}$ is the path turn width which is a non-constant value at the turns. $P_{tw}$ is defined as per the below equation.

$$P_{tw} = Pw/(\sin(\theta/2)), \text{ where } \theta = 180 - \text{angle of turn}.$$

Hence, narrow walled paths may be avoided while generating limitless navigation in virtual environment.

FIGS. 8A-8H are exemplary diagrams that represent generating dynamic path segments to utilize the real physical space efficiently according to some embodiments herein. FIGS. 8A-8D is an exemplary diagram that represents under utilized real physical area D (x, z) with equal path segments. The user 102 navigates through the virtual environment with immediate turns. This can be avoided by varying the segment length, thus utilizing the available play area effectively. The segment length may be changed based on the size of the real physical area D (x, z). Alternately, the segment length may be determined based on the remaining length of the real physical area D (x, z) at every instance of path generation rather than making constant.

FIGS. 8E-8H is an exemplary diagram that represents dynamic setting of path segment length to utilize the real physical area D (x, z) efficiently. To use the physical space more efficiently, the segment length is set dynamically based on the proximity of the end of the existing path. The current path is generated dynamically from the boundary in the direction in which the new line segment has to be generated. Here, $dP_l$ is the dynamically generated path length segment, $P_l$ is the path line segment length which is fixed value, $b_d$ is the boundary distance which is the projected line that eventually hit the boundary from the end position of the last path segment generated for the user 102 to locomote in the virtual environment. The length of the new path segment may be randomly picked as per the following equation.

$$dP_l = RAND(P_l, b_d)$$

The user 102 navigates in the virtual environment by advancing further with unequal path segment lengths with less frequent turns. The path segments are dynamic in length, a random length unit value between fixed path segment length and boundary distance. Using the above equation, the underutilized physical room space can be avoided to a greater extent while developing virtual environment scenes.

Figure 9A:
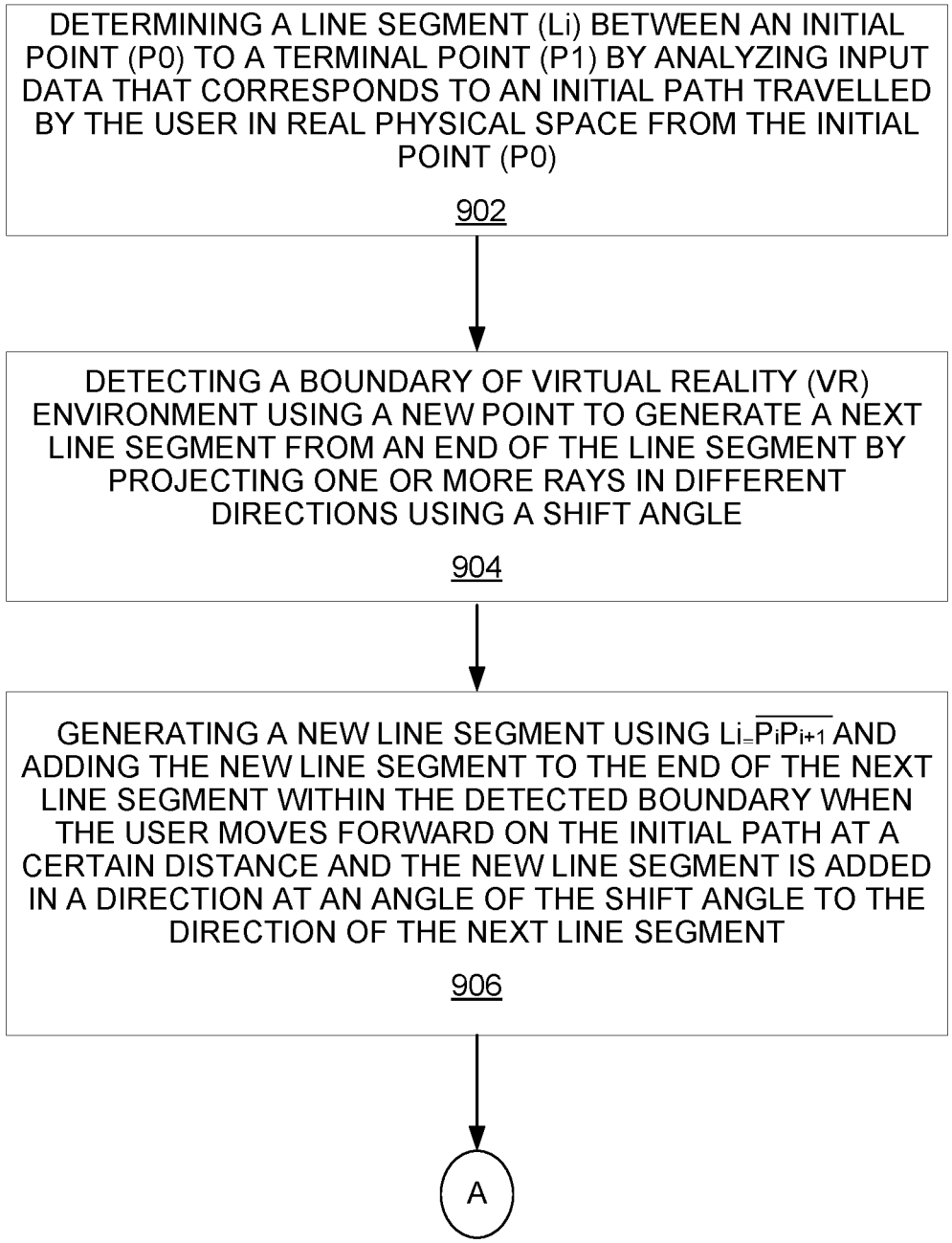
FIGS. 9A and 9B are flow diagrams that illustrates a method for generating a limitless path in a virtual reality environment (VR) for a continuous locomotion within a real physical space using a Head-Mounted-Display (HMD) device associated with a user according to some embodiments herein.
Figure 9B:
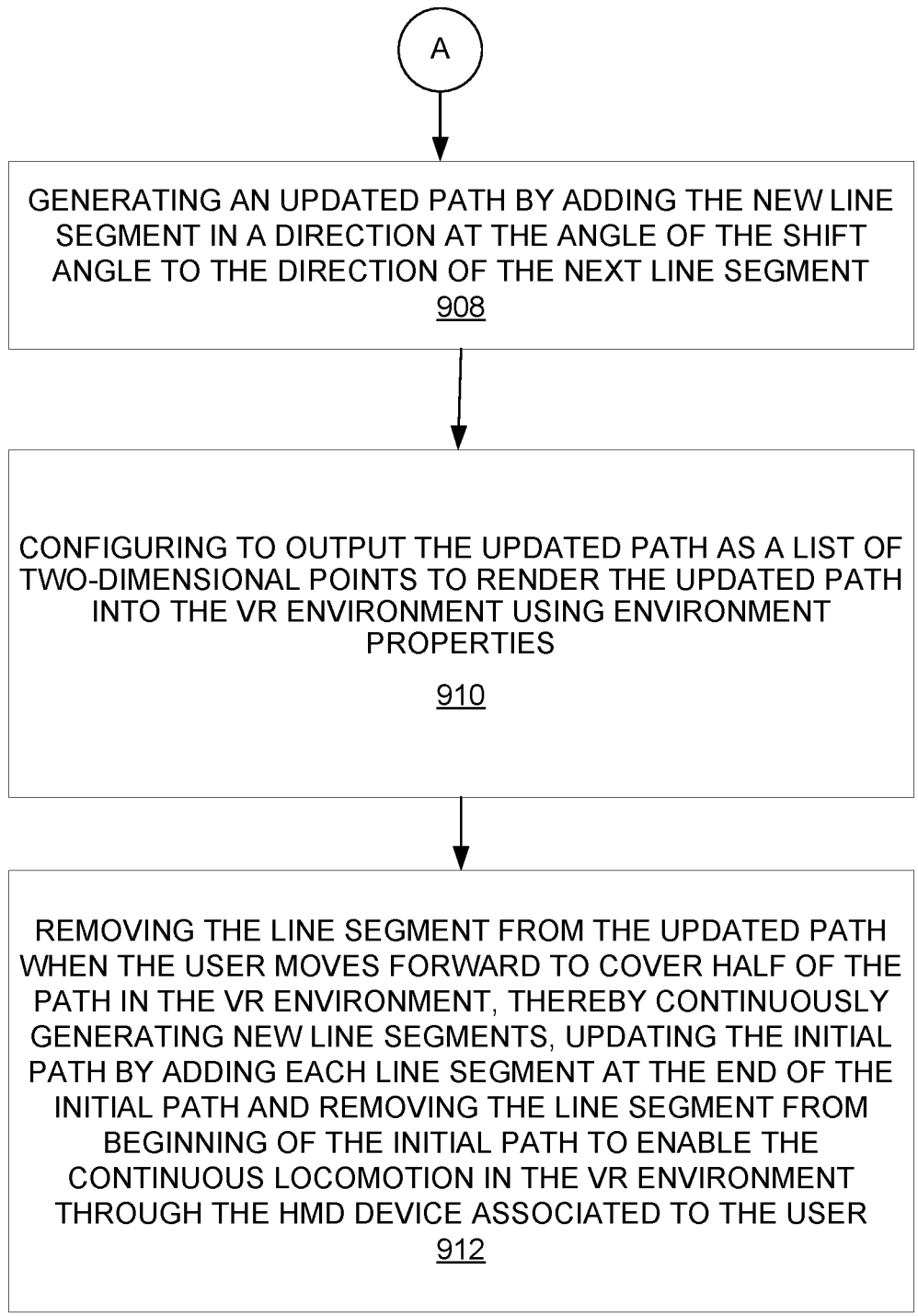

FIGS. 9A and 9B are flow diagrams that illustrate a method of generating a continuous path in a virtual reality environment (VR) for a continuous locomotion using a Head-Mounted-Display (HMD) device associated with a user according to some embodiments herein. At step 902, the method includes determining a line segment ($L_i$) between an initial point ($P_0$) to a terminal point (P1) by analyzing input data that corresponds to an initial path travelled by the user in the real physical space from the initial point ($P_0$). In some embodiments, the input data is obtained from the HMD associated with the user. In some embodiments, the line segment is determined by $Li = \overline{(Pi)*(Pi)+1}$ where 'i' is in a range of natural numbers comprising 0 to n−1 and '—' is an overhead bar that symbolises the line segment ($L_i$) of a predetermined length. The method includes detecting a boundary of the VR environment using a new point to generate a next line segment from an end of the line segment by projecting a plurality of rays in different directions using a shift angle. In some embodiments, the shift angle is an angle between the line segment of the initial path and the next line segment of an upcoming path. At step 904, the method includes generating a new line segment and adding the new line segment to the end of the initial path when the user moves forward on the initial path at a certain distance using the shift angle. At step 906, the method includes generating a new line segment using $Li = \overline{(Pi)*(Pi+1)}$ and adding the new line segment to the end of the next line segment within the detected boundary when the user moves forward on the initial path at a certain distance and the new line segment is added in a direction at an angle of the shift angle to the direction of the next line segment. At step 908, the method includes generating an updated path by adding the new line segment in a direction at the angle of the shift angle to the direction of the next line segment. At step 910, the method includes, configuring to output the updated path as a list of two-dimensional points to render the updated path into the virtual reality environment using environmental properties. At step 912, the method includes removing the line segment from the updated path when the user moves forward to cover half of the path in the virtual reality environment, thereby continuously generating new line segments, updating the initial path by adding each new line segment at the end of the initial path and removing line segment from beginning of the initial path to enable the continuous locomotion in the virtual reality environment through the HMD associated to the user.

In some embodiments, the input data includes (i) the initial point ($P_0$) and head-yaw ($\beta_0$) of the HMD at the initial point (ii) dimensions of boundary of the real physical space D(x, z), and (iii) path properties that include segment length (l) and path width (w).

In some embodiments, the shift angle is determined by $\gamma_j = \beta_{i-1} - \pi/2 + ((\pi/j)*k)$, where k is in range $\{0, j\}$; j>0 and the shift angle ranges between $\beta_{i-1} - \pi/2$, $\beta_{i-1} + \pi/2$.

In some embodiments, the environmental properties comprise at least one of information regarding assets placed in the virtual reality environment, information about textures, or placement of assets in the virtual reality environment.

In some embodiments, points in the VR environment is determined by $Pi+1(x) = 1*\sin \beta_i + Pi(x)$, and $Pi+1(z) = 1*\cos \beta_i + Pi(z)$.

In some embodiments, the head-yaw ($\beta_i$) at $i^{th}$ point ranges from $\beta_{i-1} - \pi/2$, $\beta_{i-1} + \pi/2$.

In some embodiments, the method includes generating the path using the line and path walls without an intersection of the path walls by maintaining the ratio of the width of the path to the length of the path at a constant to avoid the intersection of the walls in the virtual reality environment.

In some embodiments, the method includes generating the limitless path in the virtual environment with parallel walls of the path by correlating the width of the path at the turns with the angle of the turn.

In some embodiments, the method includes generating dynamic path segments based on a random length unit value between the length of the fixed path segment and the proximity distance, thereby utilizing the real physical space efficiently.

Figure 10:
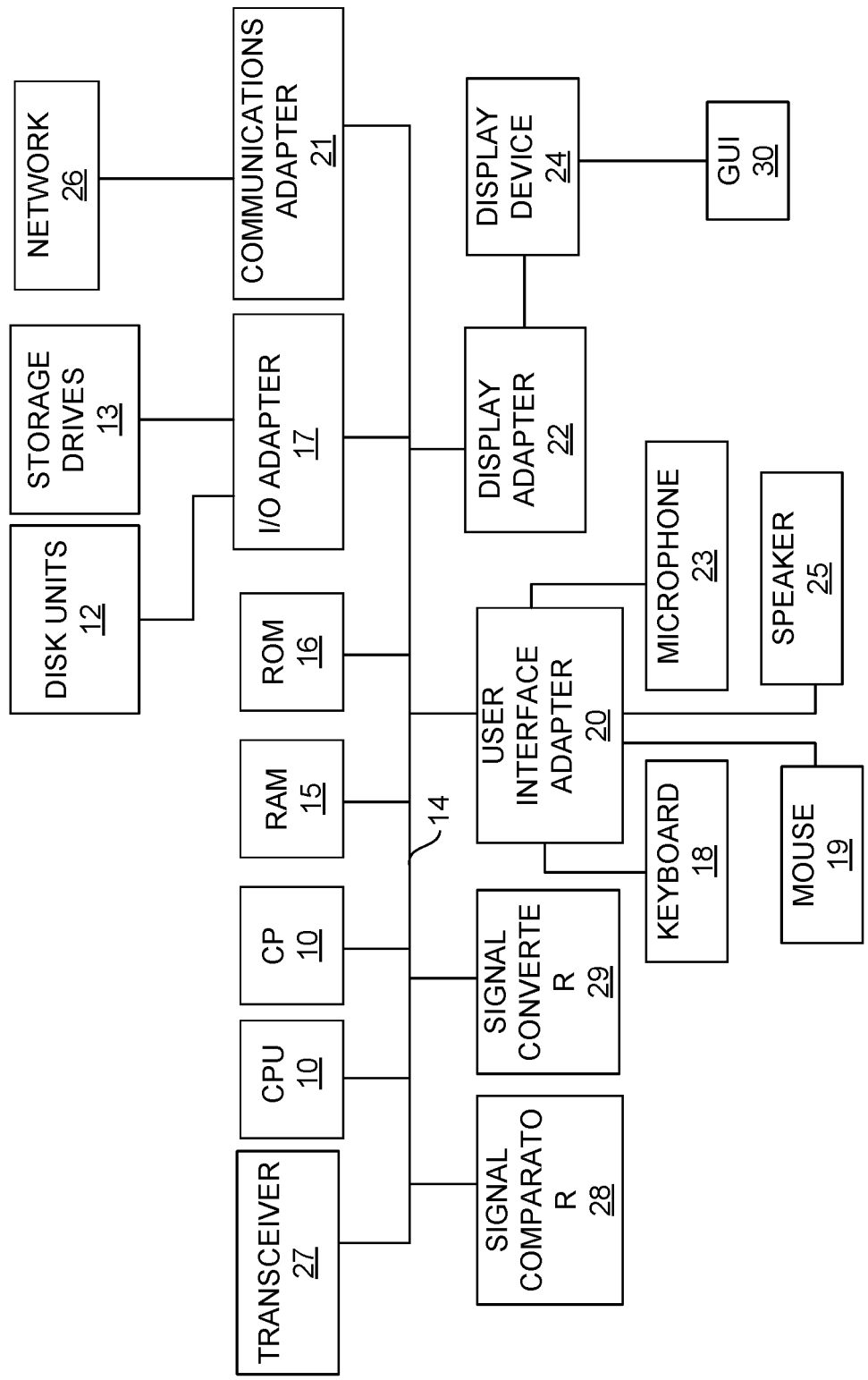
FIG. 10 is a schematic diagram of a computer architecture in accordance with the embodiments herein.

A representative hardware environment for practicing the embodiments herein is depicted in FIG. 10, with reference to FIGS. 1 through 9. This schematic drawing illustrates a hardware configuration of a server/computer system/computing device in accordance with the embodiments herein. The system includes at least one processing device CPU 10 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for generating a continuous path in a virtual reality environment (VR) for a limitless locomotion within a real physical space using a Head-Mounted-Display (HMD) device associated with a user, the method comprising:
    determining a first line segment ($L_0$) between an initial point ($P_0$) to a second point ($P_1$) by analyzing input data that corresponds to an initial path travelled by the user in the real physical space from the initial point ($P_0$), wherein the input data is obtained from the HMD device associated with the user, wherein the line segment ($L_0$) is determined by an equation $Li=\overline{(Pi)*(Pi+1)}$ by including a value of i equal to 0, where 'i' is in a range of natural numbers comprising 0 to n−1 and '—' is an overhead bar that symbolises the line segment ($L_i$) of a predetermined length;
    detecting a boundary of the VR environment using a third point ($P_2$) to generate a second line segment ($L_2$) from an end of the first line segment ($L_0$) by projecting a plurality of rays from the second point ($P_1$) in different directions using a shift angle, wherein the shift angle is an angle between the first line segment of the initial path and the second line segment ($L_2$) of an upcoming path;
    generating a third line segment ($L_3$) using the equation $Li=\overline{(Pi)*(Pi+1)}$ by including the value of i equal to 3, and adding the third segment ($L_3$) to the end of the second line segment ($L_2$) within the boundary when the user moves forward on the initial path at a certain distance and the third line segment ($L_3$) is added in a direction at an angle of the shift angle to the direction of the third line segment ($L_3$);
    generating an updated path by adding the third line segment ($L_3$) in the direction of the shift angle to the direction of the second line segment;
    configuring to output the updated path as a list of two-dimensional points to render the updated path into the virtual reality environment using environmental properties; and
    removing the first line segment ($L_0$) from the updated path when the user moves forward to cover half of the initial path in the virtual reality environment, thereby continuously generating new line segments ($L_4$, $L_5$, $L_6$, . . . $L_n$) and, updating the initial path by adding each new line segment at the end of the initial path and removing a previous line segment from beginning of the initial path to enable the continuous locomotion in the virtual reality environment through the HMD device associated to the user.

2. The processor-implemented of claim 1, wherein the input data comprises (i) the initial point ($P_0$) and head-yaw ($\beta_0$) of the HMD device at the initial point (ii) dimensions of boundary of the real physical space $D(x, z)$, and (iii) path properties that include segment length (l) and path width (w), wherein x is a dimension of the boundary of the real physical space in an x-axis, and z is the dimension of the boundary of the real physical space in a z-axis.

3. The processor-implemented of claim 1, wherein the shift angle is determined by $\gamma_j=\beta_{i-1}-\pi/2+((\pi/j)*k)$, where k comprising from 0 to j; where j is a number that is greater than zero, and the shift angle ranges between $\beta_{i-1}-\pi/2$, $\beta_{i-1}+\pi/2$.

4. The processor-implemented of claim 1, wherein the environmental properties comprise at least one of information regarding assets placed in the virtual reality environment, information about textures, or placement of assets in the virtual reality environment.

5. The processor-implemented of claim 4, wherein points ($P_0$, $P_1$, $P_2$, $P_3$, $P_4$, . . . $P_n$) in the VR environment is determined by $P_{i+1}(x)=1*\sin \beta_i+Pi(x)$, and $P_{i+1}(z)=1*\cos \beta_i+Pi(z)$, wherein x is the dimension of the boundary of the real physical space in the x-axis, and z is the dimension of the boundary of the real physical space in the z-axis.

6. The processor-implemented of claim 1, wherein the head-yaw ($\beta_i$) at $i^{th}$ point ranges from $\beta_{i-1}-\pi/2$, $\beta_{i-1}+\pi/2$, where 'i' is in range of natural numbers comprising from 0 to n−1.

7. The processor-implemented of claim 1, wherein the method comprises generating the continuous path using the line segments ($L_0$, $L_1$, $L_2$, . . . $L_n$) and path walls without an intersection of the path walls by maintaining the ratio of the width of the continuous path to the length of the continuous path at a constant to avoid the intersection of the walls in the virtual reality environment.

8. The processor-implemented of claim 1, wherein the method comprises generating the continuous path in the virtual reality environment with parallel walls of the continuous path by correlating the width of the continuous path at the turns with the angle of the turn.

9. The processor-implemented of claim 8, wherein the method comprises generating dynamic path segments based on a random length unit value between a length of a fixed path segment and a proximity distance, thereby utilizing the real physical space efficiently.

10. One or more non-transitory computer-readable storage medium storing the one or more sequence of instructions, which when executed by the one or more processors, causes to perform a method for generating a continuous path in a virtual reality environment (VR) for a limitless locomotion within a real physical space using a Head-Mounted-Display (HMD) device associated with a user, said method comprising:
    determining a first line segment ($L_0$) between an initial point ($P_0$) to a second point ($P_1$) by analyzing input data that corresponds to an initial path travelled by the user in the real physical space from the initial point ($P_0$), wherein the input data is obtained from the HMD device associated with the user, wherein the line segment ($L_i$) is determined by an equation $Li=\overline{(Pi)*(Pi+1)}$ by including a value of i equal to 0, where 'i' is in a range of natural numbers comprising 0 to n−1 and '—' is an overhead bar that symbolises the line segment ($L_i$) of a predetermined length;

detecting a boundary of the VR environment using a third point ($P_2$) to generate a second line segment ($L_2$) from an end of the first line segment ($L_0$) by projecting a plurality of rays from the second point ($P_1$) in different directions using a shift angle, wherein the shift angle is an angle between the first line segment of the initial path and the second line segment ($L_2$) of an upcoming path;

generating a third line segment ($L_3$) using the equation by including the value of i equal to 3, and adding the third line segment ($L_3$) to the end of the second line segment ($L_2$) within the boundary when the user moves forward on the initial path at a certain distance and the third line segment ($L_3$) is added in a direction at an angle of the shift angle to the direction of the third line segment ($L_3$);

generating an updated path by adding the third line segment ($L_3$) in the direction of the shift angle to the direction of the second line segment;

configuring to output the updated path as a list of two-dimensional points to render the updated path into the virtual reality environment using environmental properties; and removing the first line segment ($L_0$) from the updated path when the user moves forward to cover half of the initial path in the virtual reality environment, thereby continuously generating new line segments ($L_4$, $L_5$, $L_6$, ... $L_n$) and, updating the initial path by adding each new line segment at the end of the initial path and removing a previous line segment from beginning of the initial path to enable the continuous locomotion in the virtual reality environment through the HMD device associated with the user.

11. A system for generating a continuous path in a virtual reality environment (VR) for a limitless locomotion within a real physical space using a Head-Mounted-Display (HMD) device associated with a user, the system comprising:

a device processor; and a non-transitory computer-readable storage medium storing one or more sequences of instructions, which when executed by the device processor, causes:

determine a first line segment ($L_0$) between an initial point ($P_0$) to a second point ($P_1$) by analyzing input data that corresponds to an initial path travelled by the user in the real physical space from the initial point ($P_0$), wherein the input data is obtained from the HMD device associated with the user, wherein the line segment ($L_i$) is determined by an equation $Li=\overline{(Pi)*(Pi+1)}$ by including a value of i equal to 0, where 'i' is in a range of natural numbers comprising 0 to n−1 and '—' is an overhead bar that symbolises the line segment ($L_i$) of a predetermined length;

detect a boundary of the VR environment using a third point ($P_2$) to generate a second line segment ($L_2$) from an end of the first line segment ($L_0$) by projecting a plurality of rays from the second point ($P_1$) in different directions using a shift angle, wherein the shift angle is an angle between the first line segment of the initial path and the second line segment ($L_2$) of an upcoming path;

generate a third line segment ($L_3$) using the equation $Li=\overline{(Pi)*(Pi+1)}$ by including the value of i equal to 3, and adding the third line segment ($L_3$) to the end of the second line segment ($L_2$) within the boundary when the user moves forward on the initial path at a certain distance and the third line segment ($L_3$) is added in a direction at an angle of the shift angle to the direction of the third line segment ($L_3$);

generate an updated path by adding the third line segment ($L_3$) in the direction of the shift angle to the direction of the second line segment;

configure to output the updated path as a list of two-dimensional points to render the updated path into the virtual reality environment using environmental properties; and remove the first line segment ($L_0$) from the updated path when the user moves forward to cover half of the initial path in the virtual reality environment, thereby continuously generating new line segments ($L_4$, $L_5$, $L_6$, ... $L_n$) and, updating the initial path by adding each new line segment at the end of the initial path and removing a previous line segment from beginning of the initial path to enable the continuous locomotion in the virtual reality environment through the HMD device associated to the user.

12. The system of claim 11, wherein the input data comprises (i) the initial point ($P_0$) and head-yaw ($\beta_0$) of the HMD device at the initial point (ii) dimensions of boundary of the real physical space $D(x, z)$, and (iii) path properties that include segment length (l) and path width (w), wherein x is a dimension of the boundary of the real physical space in an x-axis, and z is the dimension of the boundary of the real physical space in a z-axis.

13. The system of claim 11, wherein the shift angle is determined by $\gamma_j=\beta_{i-1}-\pi/2+((\pi/j)*k)$, where k comprising from 0 and j; where j is a number that is greater than zero, and the shift angle ranges between $\beta_{i-1}-\pi/2$, $\beta_{i-1}+\pi/2$.

14. The system of claim 11, wherein the environmental properties comprise at least one of information regarding assets placed in the virtual reality environment, information about textures, or placement of assets in the virtual reality environment.

15. The system of claim 11, wherein points ($P_0$, $P_1$, $P_2$, $P_3$, $P_4$, ... $P_n$) in the VR environment is determined by $P_{i+1}(x)=1*\sin \beta_i+Pi(x)$, and $P_{i+1}(z)=1*\cos \beta_i+Pi(z)$, where x is the dimension of the boundary of the real physical space in x-axis, and z is the dimension of the boundary of the real physical space in z-axis.

16. The system of claim 11, wherein the head-yaw ($\beta_i$) at $i^{th}$ point ranges from $\beta_{i-1}-\pi/2$, $\beta_{i-1}+\pi/2$, where 'i' is in range of natural numbers that is (0, n−1).

17. The system of claim 11, wherein the environmental properties comprise at least one of information regarding assets placed in the virtual reality environment, information about textures, or placement of assets in the virtual reality environment.

18. The system of claim 11, wherein the processor is configured to generate the path using the continuous path using line segments ($L_0$, $L_1$, $L_2$, ... $L_n$) and path walls without an intersection of the path walls by maintaining the ratio of the width of the continuous path to the length of the continuous path at a constant to avoid the intersection of the walls in the virtual reality environment.

19. The system of claim 11, wherein the processor is configured to generate the continuous path in the virtual reality environment with parallel walls of the path by correlating the width of the continuous path at turns with the angle of the turn.

20. The system of claim 11, wherein the processor is configured to generate dynamic path segments based on a random length unit value between the length of the fixed path segment and a proximity distance, thereby utilizing the real physical space efficiently.

* * * * *